Figure 1:
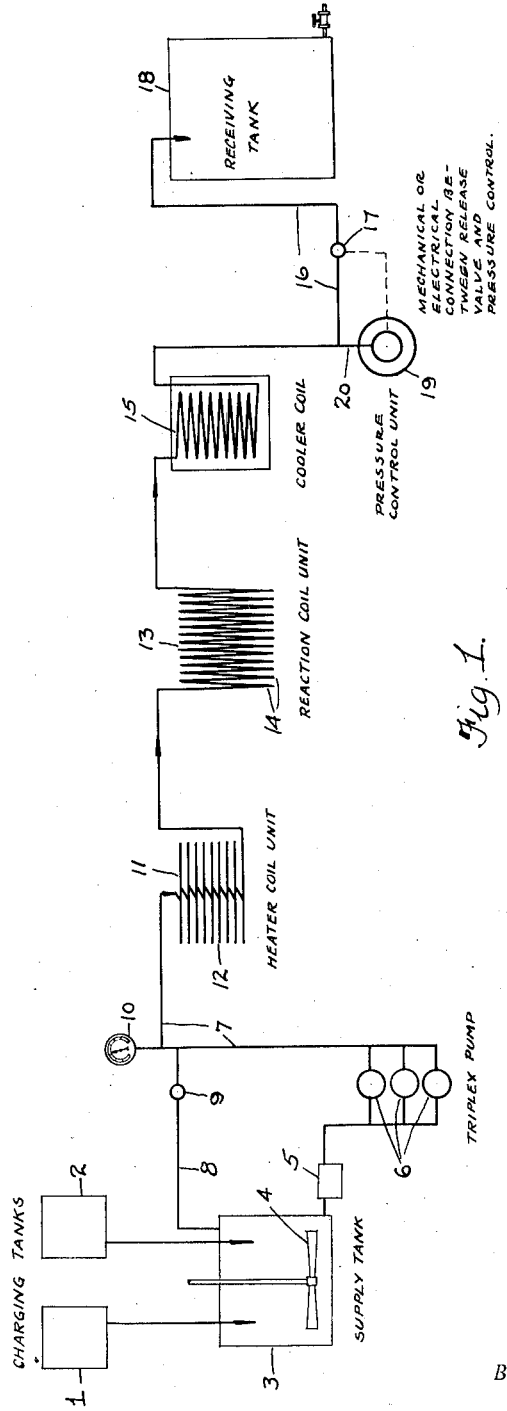

Oct. 12, 1926.

T. GRISWOLD, JR 1,602,766

TUBULAR REACTION APPARATUS

Original Filed June 19, 1925    2 Sheets-Sheet 1

INVENTOR.
Thomas Griswold, Jr.
BY
Fay, Oberlin & Fay
ATTORNEYS

Oct. 12, 1926.  
T. GRISWOLD, JR  
1,602,766  
TUBULAR REACTION APPARATUS  
Original Filed June 19, 1925    2 Sheets-Sheet 2

INVENTOR.  
Thomas Griswold, Jr.  
BY  
Fay, Oberlin & Fay  
ATTORNEYS

Patented Oct. 12, 1926.

1,602,766

UNITED STATES PATENT OFFICE.

THOMAS GRISWOLD, JR., OF MIDLAND, MICHIGAN, ASSIGNOR TO THE DOW CHEMICAL COMPANY, OF MIDLAND, MICHIGAN, A CORPORATION OF MICHIGAN.

TUBULAR REACTION APPARATUS.

Application filed June 19, 1925, Serial No. 38,290. Renewed August 26, 1926.

The present improvements relate more particularly to a form of tubular autoclave suitable for carrying on chemical reactions wherein the mixture of reacting ingredients requires to be maintained at a high temperature and under high pressure for a considerable length of time in order that the reaction may be carried to completion. As an illustration of a process of the type in question, reference may be had to the manufacture of phenols and amines from halogenated benzene hydrocarbons. Thus, specifically, it is known that an alkali metal phenate may be made by reacting between mono-chlorbenzene and caustic alkali in aqueous solution at temperatures between 250° and 400° C., provided a pressure greater than the vapor tension of the reacting substances is maintained. The phenate thus produced may then be treated with an acid to liberate phenol, $C_6H_5OH$, and the latter separated from the solution in the usual way.

There are obvious advantages in conducting a process of this sort in a tubular autoclave through which such reacting substances may be passed continuously, fresh material being supplied at the one end and the product of the reaction being drawn off at a corresponding rate at the other end. Aside, however, from serious constructional difficulties, due to the high temperatures and pressures involved, a tubular system suitable for a process of the kind just referred to requires to be of a very considerable length in order to have the necessary capacity and allow for the necessary time interval if the reaction is to be carried to even approximate completion and of course if this is not done, the process is uneconomical. There is also presented a problem of control both as to rate of flow of the reacting substances and the pressure within the system, such pressure being varied not only by the rate of supply, which can of course be regulated more or less nicely, but also by variations in temperature, which latter necessarily tends to fluctuate somewhat.

The object of the present invention, accordingly, is to provide an apparatus of the type in question in which a tubular system of adequate length may be utilized and yet permit of an extremely close and automatic regulation of the pressure therein. A further object is to utilize in an economical fashion the heat required to bring the reacting substances to the proper temperature and to maintain such temperature throughout the system. Still another object is to provide for the automatic discharge of the products of the reaction from the system.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 2:
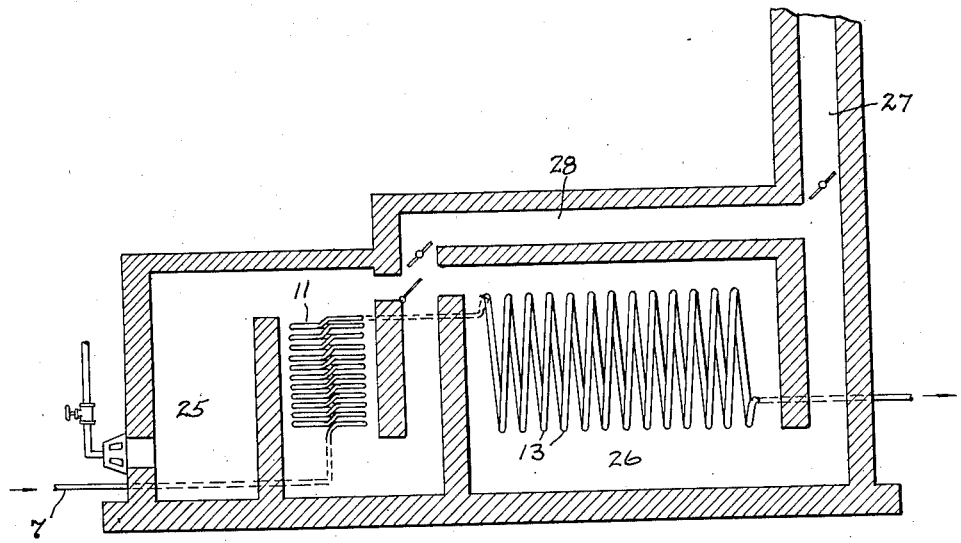
Figure 3:
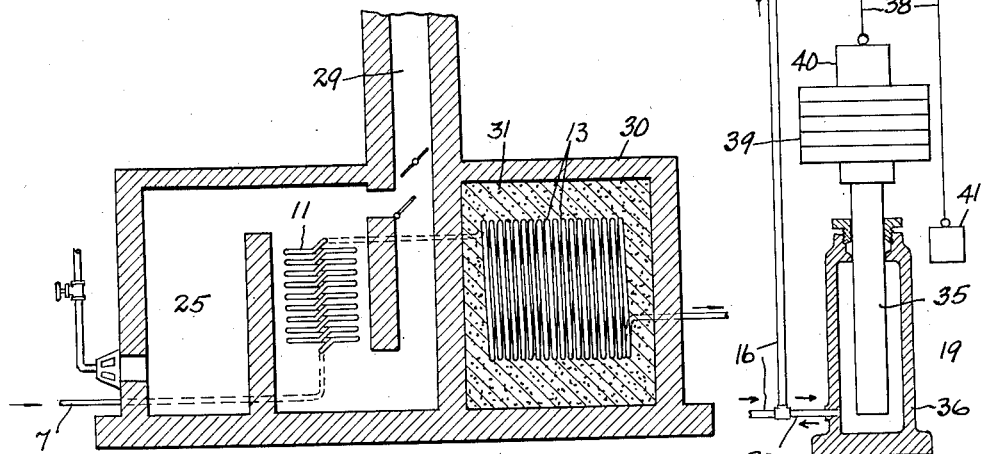
Figure 4:
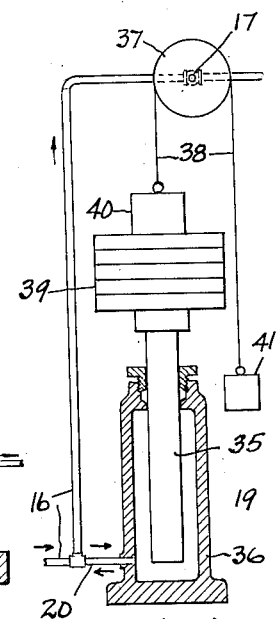

Fig. 1 is a diagrammatic representation of a chemical reaction apparatus including a tubular autoclave wherein the present improvements are incorporated; Fig. 2 is a sectional view of the several coils that are connected in series to form such autoclave, together with surrounding portions of the apparatus; Fig. 3 is a view similar to Fig. 2 but showing a modification in construction; and Fig. 4 is a sectional view of a detail of one of the control devices utilized in connection with the system.

Referring to the general layout of a typical plant as illustrated in Fig. 1, the reacting material, as for example mono-chloro-benzene and caustic alkali solution, are supplied either continuously or at intervals and in the proper proportion from charging tanks 1, 2, respectively, to a supply tank 3 equipped with a stirrer 4. From such last mentioned tank the liquid mixture is withdrawn through a strainer 5 and forced by means of a triplex pump 6 into the supply line 7 proper of the autoclave. Leading back from such supply line to tank 3 is a return line 8 with a safety relief valve 9 interposed therein, and at a suitable point in such supply line a pressure gauge 10 is attached.

The first unit of the autoclave is a heater unit 11, preferably made up of a series of horizontal coils of so-called pancake type, sufficient space being left between such coils so as to allow free play thereabout of combustion gases where the heat is applied through this medium. The second unit of the autoclave is a reaction unit and consists of a plurality of coils similar to those used in the heater unit but preferably more closely spaced together. The pipe in the individual coils, moreover, in such reaction unit will be as closely wound as possible. Freely connected in turn with the reaction unit is a cooling coil 15, the detail construction of which does not require description, and from the latter leads the discharge line 16 of the system, such discharge line being controlled by a suitable valve 17 and a tank 18 being provided to receive the discharge from said line.

Valve 17 is operatively connected through suitable means, such as those presently to be described, with a fluid pressure actuated control unit 19 that is connected by means of a branch 20 with discharge line 16 at a point between said valve 17 and the cooling coil 15. Said unit 19 is adjustable so as to open valve 17 more and more widely as pressure is built up in the autoclave and to close said valve more and more as such pressure falls.

As indicated, the heating unit 11 is most conveniently raised to the temperature at which the reaction between the ingredients supplied to the autoclave will react by means of gases of combustion, one illustrative arrangement being shown in Fig. 2 where such coil is so located with respect to combustion chamber 25 as to cause the gases of combustion to pass through the unit in a direction opposite to that in which the liquid mixture passes therethrough, this being advantageous for efficient heat transfer. In the specific embodiment shown in Fig. 2, the reaction unit 13 is located in a second chamber 26 adjacent the portion of the combustion chamber in which the heating unit is thus placed and the stack 27 may be optionally connected with such combustion chamber either through said chamber 26 or through a by-pass flue 28, suitable dampers or valves controlling the path which such gases travel. In operating this form of the apparatus, the gases of combustion are initially by-passed to raise the temperature of the heating coil and then during the further operation of the apparatus, the temperature of the reaction coil is maintained with waste heat from the combustion chamber.

In the alternative form of construction shown in Fig. 3, the location and arrangement of the heating unit with respect to combustion chamber 25 remains unchanged, but the flue 29 is here directly connected with such chamber and the reaction coil 13 is located in a chamber 30 entirely disconnected from although still adjacent to said combustion chamber. A packing 31 of heat insulating material, furthermore, closely surrounds said reaction coil so as to prevent, as far as possible, radiation of heat therefrom.

The pressure controlled device 19, illustrated in Fig. 4, for operating valve 17 takes the form of a weighted plunger 35 that is vertically reciprocable in a liquid tight chamber 36 and the connections between said device and the valve take the form of a sheave 37, mounted on the stem of the valve, and a cord or chain 38 that passes around said sheave, one end of the cord being attached to the upper weighted end 39 of plunger 35 by means of a weight 40 to which such cord end is attached, while a second smaller weight 41 is attached to the free end of the cord so as to hold the latter in necessary frictional contact with sheave 37. The weight 39 on the end of the plunger is of such a character that the load on the plunger may be varied so that it will be lifted upon a predetermined pressure being built up within chamber 36. Such chamber being in free communication with the series of coils 11, 13 and 15, the pressure therein will of course correspond with the pressure in the latter and such pressure in turn will be indicated by the gauge 10.

It will be understood that various other forms of fluid pressure actuated regulating devices may be employed to operate the discharge valve 17, such for example as a Bourdon gauge or similar instrumentality, either connected directly with the valve or by means of a relay.

The operation of the system as a whole will be readily understood from the foregoing description of the construction and operation of its several component parts. The liquid reaction mixture received through line 7 first passes through coil 11 where it is quickly heated to the optimum temperature, e. g. 250° to 400° C., in the case of the particular ingredients referred to above, the particular temperature that will be best for such reaction depending on various considerations that do not form a part of the present invention. By the time such liquid mixture has been brought to the desired temperature, it passes over into the reaction coil which is of such length that at the given rate of flow a sufficient body of the mixture will remain therein to permit substantial completion of the reaction, providing the necessary temperature is maintained. In each of the two forms of construction illustrated in Figs. 2 and 3, respectively, it will be noted that the direct application of heat from the furnace chamber is found unnecessary and in fact in the second construction not even the waste heat from such combustion chamber is utilized; on the contrary, it has been found satisfactory simply to insulate the reaction coil so as to prevent radiation as far as possible of heat therefrom, with the result that the liquid mixture continues on its course through said coil at a practically unchanged temperature.

The liquid is then cooled in coil 15 in order to reduce the difficulty attendant upon the discharge thereof at the high pressure that is maintained throughout the system, such pressure in some cases being as great as 4000 lbs. per square inch. The discharge of the liquid, as already explained, is automatically taken care of by the pressure controlled device 19 which operates the valve 17 so as to allow the liquid mixture to flow through line 16 at the same rate as it is supplied through pump 6 to line 7.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination of two liquid-containing receptacles connected in series, the second of said receptacles comprising a plurality of coils, means adapted to cause a flow of liquid through said receptacles under pressure, means for heating said first receptacle, and heat-insulating means surrounding the second receptacle.

2. The combination of two liquid-containing receptacles connected in series, the second of said receptacles comprising a plurality of coils, means adapted to cause a flow of liquid through said receptacles under pressure, means for heating said first receptacle, heat-insulating means surrounding the second receptacle, and means adapted automatically to regulate the pressure of the liquid in said receptacles.

3. The combination of three liquid-containing receptacles connected in series, the second of said receptacles comprising a plurality of coils, means for supplying liquid to the first and means for withdrawing liquid from the last of said receptacles, means for heating said first receptacle, and heat-insulating means surrounding the second receptacle, the third receptacle being exposed to a cooling medium.

4. The combination of three liquid-containing receptacles connected in series, the second of said receptacles comprising a plurality of coils, means for supplying liquid to the first and means for withdrawing liquid from the last of said receptacles, means for heating said first receptacle, heat-insulating means surrounding the second receptacle, the third receptacle being exposed to a cooling medium, and means associated with said liquid withdrawing means, adapted automatically to regulate the pressure of the liquid in said receptacles.

5. The combination of two liquid-receptacles connected in series, each said receptacle comprising an extended tubular passageway, means for heating the first tubular passageway, and means for preventing substantial heat-loss from the second tubular passageway.

6. The combination of a heating coil, a furnace associated therewith, a heat-insulated reaction coil connected with said heating coil, and means for supplying liquid to said heating coil and for withdrawing liquid from said reaction coil.

7. The combination of a heating coil, a furnace associated therewith, a heat-insulated reaction coil connected with said heating coil, means for supplying liquid to said heating coil and for withdrawing liquid from said reaction coil, and means associated with said liquid withdrawing means adapted automatically to regulate the pressure of the liquid in said coils.

8. The combination of a heating coil, a furnace associated therewith, a heat-insulated reaction coil connected with said heating coil, a cooling coil connected in turn with said reaction coil, and means for supplying liquid to said heating coil and for withdrawing liquid from said cooling coil.

9. The combination of a heating coil, a furnace associated therewith, a heat-insulated reaction coil connected with said heating coil, a cooling coil connected in turn with said reaction coil, means for supplying liquid to said heating coil and for withdrawing liquid from said cooling coil, and means adapted automatically to regulate the pressure of the liquid in said coils.

10. In a high-pressure, high-temperature tubular reaction-apparatus, the combination of a furnace, a coil for heating liquid located in said furnace, a heat-insulated reaction coil connected with said heating coil, a cooling coil connected in turn with said reaction coil, means for supplying liquid under pressure to said heating coil, means for withdrawing liquid from said cooling coil, and means associated with said liquid withdrawing means adapted automatically to regulate the pressure of the liquid in said coils.

11. In a high-pressure, high-temperature tubular reaction-apparatus, the combination of a furnace, a coil for heating liquid located in said furnace, a heat-insulated reaction coil connected with said heating coil, a cooling coil connected in turn with said reaction coil, means for supplying liquid under pressure to said heating coil, a valve controlling the withdrawal of liquid from said cooling coil, and a device responsive to the pressure in said coils adapted to operate said valve.

12. In a high-pressure, high-temperature tubular reaction-apparatus, the combination of a furnace, a coil for heating liquid located in said furnace, a heat-insulated reaction coil connected with said heating coil, a cooling coil connected in turn with said reaction coil, means for supplying liquid under pressure to said heating coil, a valve controlling the withdrawal of liquid from said cooling coil, and an adjustable device responsive to the pressure in said coils adapted to operate said valve.

Signed by me, this 15th day of June, 1925.

THOS. GRISWOLD, Jr.